Dec. 5, 1944.    J. M. STRANG ET AL    2,364,174
MECHANISM FOR THE CONVERSION OF MOTION ACCORDING TO ONE
LAW INTO MOTION ACCORDING TO ANOTHER LAW
Filed Nov. 19, 1943
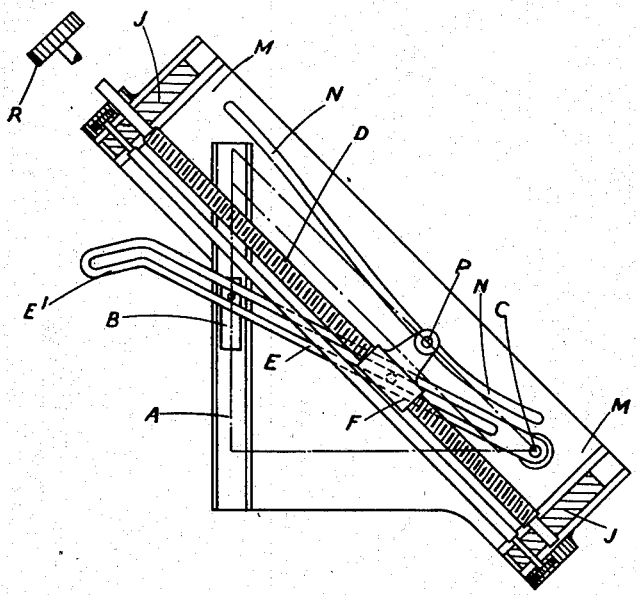
JOHN MARTIN STRANG
IAN CHARLES McLEAN BELL
*Inventors*
By
*Hewitt Griggs Robertson*
*Attorney*

Patented Dec. 5, 1944

2,364,174

UNITED STATES PATENT OFFICE

2,364,174

MECHANISM FOR THE CONVERSION OF MOTION ACCORDING TO ONE LAW INTO MOTION ACCORDING TO ANOTHER LAW

John Martin Strang and Ian Charles McLean Bell, Glasgow, Scotland, assignors to Barr & Stroud, Limited, Glasgow, Scotland Application November 19, 1943, Serial No. 510,960 In Great Britain February 14, 1942

7 Claims. (Cl. 74—89)

This invention refers to mechanism for the conversion of motion according to one law into motion according to another law, particularly, but not exclusively, in connection with rangefinders, heightfinders, and like optical measuring instruments, hereinafter for convenience referred to generally as rangefinders. Rangefinders of the translating prism type, i. e. of the type in which measurement is effected by translational movement of a light deviating prism (or prisms) operate by measuring parallax angle and the movement of the prism or prisms is not proportional to range but to reciprocal of range. Thus, ordinarily the scale of the instrument is a reciprocal scale, with the graduations becoming increasingly crowded together for higher ranges. This crowding together of the graduations at high ranges makes reading of the scale more difficult than at low ranges. The specification of British Patent No. 499,053 granted to Barr & Stroud, Limited, and the specification of United States Patent No. 1,339,643, granted to Barr & Stroud, Limited, show mechanism for converting motion according to the reciprocal law into motion according to a uniform scale. Specification of United States Patent No. 1,833,553, assigned to Barr & Stroud, Limited, shows how such conversion can be effected optically. It is with conversion apparatus for the conversion of motion according to the reciprocal law into motion according to a uniform scale that the present invention is concerned, particularly as applied to instruments of rangefinder type in which it may serve to give readings on a uniform scale of range, on a uniform scale of height, or on a uniform scale of other function of range or parallax.

The present invention relates to an improvement in or modification of the invention forming the subject-matter of our co-pending application for United States patent Serial No. 488,450, filed May 25, 1943.

In the specification of the said patent application, mechanism is described for the conversion of motion according to the reciprocal law into motion according to a uniform scale. Examples are described and illustrated, firstly, of what may be termed simple conversion, where the conversion involved is merely conversion from motion according to the reciprocal law to motion according to a uniform scale, and, secondly, of more complex conversion in which a further step is involved, for example, multiplication by the factor sin $\alpha$ to give conversion to a uniform scale of heights, $\alpha$ being the angle of elevation of the line of sight of the object under observation.

The mechanism described in the said co-pending application comprises a first element which is arranged to move in a rectilinear guide between lower and upper limits, a lever slidably and pivotally engaged with the first element and movable about a pivot which is fixed in position relative to the said guide and located to one side thereof on a line perpendicular to that guide at the lower limit position, and a second element slidably and pivotally engaged with the lever and arranged to move in a rectilinear guide the line of which intersects the first guide above the lower limit position and intersects the perpendicular from the lever pivot to the first guide at an intermediate point, the arrangement being such that movement of the second element along its guide causes angular movement of the lever and the angular movement of the lever causes movement of the first movable element, the second movable element moving according to a uniform scale and the first movable element being moved according to a reciprocal scale.

Where more complex conversion is necessary, provision is made whereby the second guide can be displaced relative to the first guide.

In accordance with the present invention, conversion mechanism is characterised by the movement applied for the purpose of effecting translation of the second element along its guide also causing the required displacement of the second guide relative to the first guide.

Mechanism of this character, applied to a rangefinder, enables motion in accordance with the reciprocal law to be converted directly to motion in accordance with uniform scale of logarithm of range, or to uniform scale of other non-linear function of range.

In carrying the invention into practice, a cam or equivalent device, designed in accordance with the required function, is provided in the mechanism and this cam governs the displacement of the second guide as the second element is translated. Thus, the cam may be a logarithmic cam. The second element may engage directly with the cam, the latter being arranged to extend alongside the second guide.

Generally the second guide is in the form of a screw threaded rod with which the second element, in the form of a nut, engages, and, in accordance with the present invention, the second guide is mounted for displacement at right angles to its axis, and a cam slot fixedly formed in the base of the mechanism extends alongside the screw threaded rod, with which cam slot the second element engages directly, so that, as the element is translated by screw action along the rod, the second element is caused to be displaced sidewise, and with it the second guide.

An example of mechanism in accordance with the invention is illustrated in plan view in the accompanying drawing, the mechanism being for application to a rangefinder for effecting conversion to a uniform scale of logarithm of range.

The mechanism comprises a first guide A, on a base structure M, a first element constituted by a slide B movable in the guide A, with which slide B the measuring prism of the instrument (not shown) is movable, a fixed pivot C on the base structure, a constant pitch screw threaded rod D, a slotted lever E pivoted at C, with the slot in which a pin on the slide B slidably and pivotally engages, and a nut F on the screw D constituting a second element and having a pin slidably and pivotally engaging with the slot of the lever E. In addition, the base structure M of the mechanism has a cam slot or groove N of logarithmic form. The screw D is mounted in slide blocks J movable on the base structure M so that the screw is capable of movement bodily at right angles to its axis, and the nut F has an arm with a pin P which engages with the cam slot N. The operating head R of the instrument applies rotational movement to the screw-threaded rod D. As the nut F is translated along the screw-threaded rod, its engagement with the cam slot N causes displacement of the screw-threaded rod D at right angles to the axis of the rod, and modifies the conversion so as to give a uniform scale of logarithm of range.

We claim:

1. Apparatus for the conversion of motion according to the reciprocal law to motion according to a uniform scale, comprising a base structure, a first rectilinear guide fixed on said base structure, a first element movable along the said guide, a pivot on the base structure at a fixed position to one side of said guide, a lever movable about said pivot and extending obliquely relative to said guide, means by which the first element slidably and pivotally engages with said lever, a second rectilinear guide extending obliquely to the line of the first guide and intersecting the perpendicular from the lever pivot to the first guide at an intermediate point, a second element movable along the said second guide and slidably and pivotally engaged with the lever, means for applying translational movement to said second element along its guide, a carriage on which the second guide is mounted and which is movable relatively to the base structure and propelling means between said carriage and the said base structure operable by the aforesaid means for translating the second element simultaneously with the application of the translational movement to the latter, translational movement of the second element being converted reciprocally in its transmission to the first element.

2. Apparatus for the conversion of motion according to the reciprocal law to motion according to a uniform scale comprising a base structure, a rectilinear guide fixed on said base structure, a first element movable along the said guide, a pivot on the base structure at a fixed position to one side of said guide, a lever movable about said pivot and extending obliquely relative to said guide, means by which the first element slidably and pivotally engages with said lever, a second rectilinear guide in the form of a screw-threaded rod extending obliquely to the line of the first guide and intersecting the perpendicular from the lever pivot to the first guide at an intermediate point, a second element in the form of a nut movable along the said second guide and slidably and pivotally engaged with the lever, means for applying rotational movement to said screw-threaded rod to move the nut along the rod, a carriage on which the rod is mounted and which is movable relatively to the base structure, and propelling means between said carriage and said base structure operable by the aforesaid means for rotating the screw-threaded rod simultaneously with the application of rotational movement to the rod, movement along the rod imparted to the nut being converted reciprocally in its transmission to the first element.

3. Apparatus for the conversion of motion according to the reciprocal law to motion according to a uniform scale comprising a base structure, a rectilinear guide fixed on said base structure, a first element movable along the said guide, a pivot on the base structure at a fixed position to one side of said guide, a lever movable about said pivot and extending obliquely relative to said guide, means by which the first element slidably and pivotally engages with said lever, a second rectilinear guide extending obliquely to the line of the first guide and intersecting the perpendicular from the lever pivot to the first guide at an intermediate point, a second element movable along the said second guide and slidably and pivotally engaged with the lever, means for applying translational movement to said second element along its guide, a carriage on which the second guide is mounted and which is movable relatively to the base structure, and propelling means including a cam arrangement between said carriage and the said base structure operable by the aforesaid means for translating the said second element simultaneously with the application of the translational movement to the latter, translational movement of the second element being converted reciprocally in its transmission to the first element.

4. Apparatus for conversion of motion according to the reciprocal law to motion according to a uniform scale comprising a base structure, a rectilinear guide fixed on said base structure, a first element movable along the said guide, a pivot on the base structure at a fixed position relative to one side of said guide, a lever movable about said pivot and extending obliquely relative to said guide, means by which the first element slidably and pivotally engages with said lever, a second rectilinear guide in the form of a screw-threaded rod extending obliquely to the line of the first guide and intersecting the perpendicular from the lever pivot to the first guide at an intermediate point, a second element in the form of a nut movable along the said second guide and slidably and pivotally engaged with the lever, means for applying rotational movement to said screw-threaded rod to move the nut along the rod, a carriage on which the rod is mounted and which is movable relatively to the base structure, and propelling means including a cam arrangement between said carriage and said base structure operable by the aforesaid means for rotating the screw threaded rod simultaneously with the application of rotational movement to the rod, movement along the rod imparted to the nut being converted reciprocally in its transmission to the first element.

5. Apparatus for the conversion of motion according to the reciprocal law to motion according to a uniform scale comprising a base structure, a rectilinear guide fixed on said base structure, a first element movable along the said guide, a pivot on the base structure at a fixed position to one side of said guide, a lever movable about said pivot and extending obliquely relative to said guide, means by which the first element slidably and pivotally engages with said lever, a second rectilinear guide in the form of a screw-threaded rod extending obliquely to the line of the first guide and intersecting the perpendicular from the lever pivot to the first guide at an intermediate point, a second element in the form of a nut movable along the said second guide and slidably and pivotally engaged with the lever, means for applying rotational movement to said screw-threaded rod to move the nut along the rod, a carriage on which the rod is mounted and which is movable relatively to the base structure, and propelling means including a logarithmic cam arrangement between said carriage and said base structure operable by the aforesaid means for rotating the screw-threaded rod simultaneously with the application of rotational movement to the rod, movement along the rod imparted to the nut being converted reciprocally in its transmission to the first element.

6. Apparatus for the conversion of motion according to the reciprocal law to motion according to a uniform scale comprising a base structure, a rectilinear guide fixed on said base structure, a first element movable along the said guide, a pivot on the base structure at a fixed position to one side of said guide, a lever movable about said pivot and extending obliquely relative to said guide, means by which the first element slidably and pivotally engages with said lever, a second rectilinear guide in the form of a screw-threaded rod extending obliquely to the line of the first guide and intersecting the perpendicular from the lever pivot to the first guide at an intermediate point, a second element in the form of a nut movable along the said second guide and slidably and pivotally engaged with the lever, means for applying rotational movement to said screw-threaded rod to move the nut along the rod, a carriage on which the rod is mounted and which is movable relatively to the base structure, a cam extending alongside said screw-threaded rod and forming part of the base structure, and a projection from the nut engaging the said cam so as to move the carriage and rod transversely relative to the latter when the nut is moved along the rod, movement along the rod imparted to the nut being converted reciprocally in its transmission to the first element.

7. Apparatus for the conversion of motion according to the reciprocal law to motion according to a uniform scale, comprising a base structure, a rectilinear guide fixed on said base structure, a first element movable along the said guide, a pivot on the base structure at a fixed position to one side of said guide, a lever movable about said pivot and extending obliquely relative to said guide, means by which the first element slidably and pivotally engages with said lever, a second rectilinear guide in the form of a screw-threaded rod extending obliquely to the line of the first guide and intersecting the perpendicular from the lever pivot to the first guide at an intermediate point, a second element in the form of a nut movable along the said second guide and slidably and pivotally engaged with the lever, means for applying rotational movement to said screw-threaded rod to move the nut along the rod, a carriage on which the rod is mounted and which is movable relatively to the base structure, a logarithmic cam extending alongside said screw-threaded rod and forming part of the base structure, and a projection from the nut engaging the said logarithmic cam so as to move the carriage and rod transversely relative to the latter when the nut is moved along the rod, movement along the rod imparted to the nut being converted reciprocally in its transmission to the first element.

J. MARTIN STRANG.
IAN C. BELL.